July 1, 1924.
C. MACMILLAN
POWER SYSTEM
Filed May 11, 1923
1,499,542
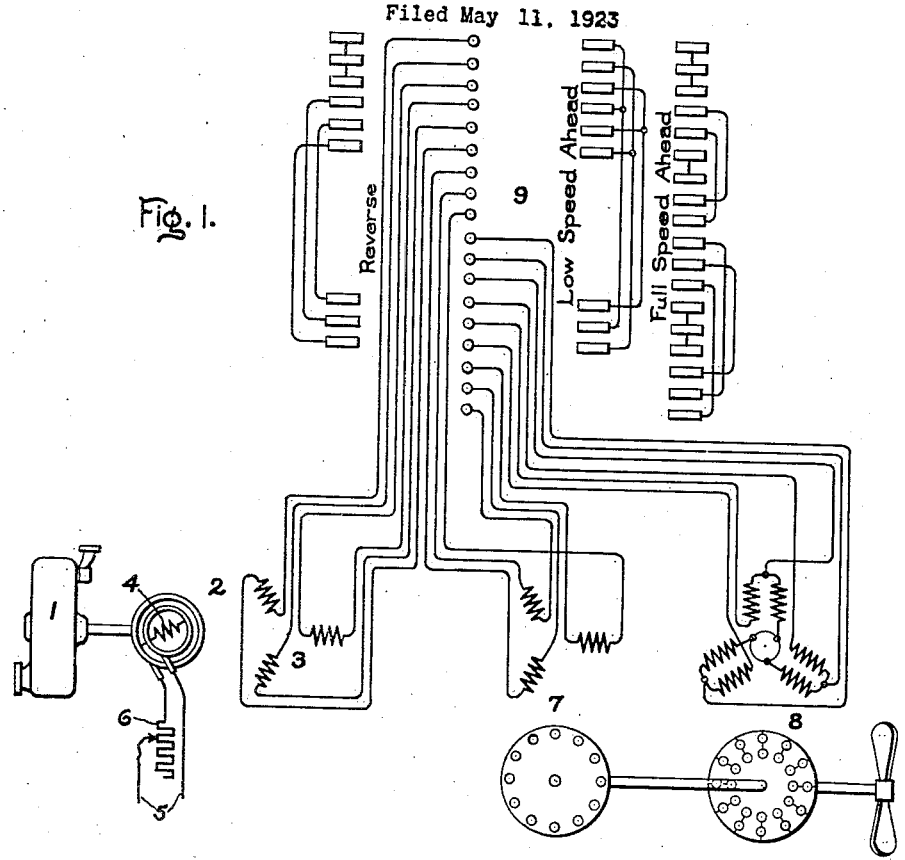
Inventor:
Campbell Macmillan,
by
His Attorney.

Patented July 1, 1924.

1,499,542

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

POWER SYSTEM.

Application filed May 11, 1923. Serial No. 638,416.

*To all whom it may concern:*

Be it known that I, CAMPBELL MACMILLAN, a citizen of the United States, residing at Schenectady, county of Schenectady, State of New York, have invented certain new and useful Improvements in Power Systems, of which the following is a specification.

My invention relates to power systems and more particularly to systems of electric ship propulsion comprising propeller motors constructed and correlated in such manner as to effect a marked saving in the weight and cost of the electrical equipment.

In induction motor equipments for electric ship propulsion it is practically necessary to use higher voltages with increasing horse-power in order to avoid large currents which necessitate the provision of excessively large cables and control switches. High voltages, however, involve the use of more insulation which necessarily increases the size of the motor and, if the motor is to have two running speeds in ratios as great as two to one, its weight is further increased due to the unfavorable utilization of active material which follows from the use of winding coils which are a compromise between those most suitable for different speeds, since in order to avoid great complication in switching it is practically necessary to use 120 degree phase belts or in other words to segregate the coils into three groups per pair of poles in the low speed winding connection, thereby lowering the efficiency and power factor. I have found that a saving of over 15% in the weight of the motor equipment is realized by using in conjunction a motor insulated for the system voltage and wound for about one half the system voltage, and a motor insulated and wound for about one half the system voltage and provided with a primary winding arranged to produce different numbers of poles.

An object of my invention is to provide a motor equipment which may be economically constructed and efficiently operated.

A further object is to provide a system of ship propulsion having an improved arrangement of the propeller motors.

My invention will be better understood from the following description taken in connection with the accompanying drawings, and its scope will be pointed out by the appended claims.

Referring now to the drawing, Fig. 1 shows a system of ship propulsion in which my invention has been embodied, and Figs. 2, 3 and 4 show various schemes of connection which may be utilized in the operation of the system.

Fig. 1 shows a turbine 1 arranged to drive an alternating current generator 2 provided with a polyphase winding 3 and a direct current field winding 4 which may be supplied with current from any suitable source 5 through suitable excitation controlling means illustrated as an adjustable rheostat 6. Provided for the purpose of regulating the supply of current from the generator 2 to the propeller motors 7 and 8 is a controller 9 of any suitable type arranged in the "full speed ahead" position to interconnect the generator and motors as indicated in Fig. 4, in the "low speed ahead" position to interconnect the generator 2 and the motor 8 as indicated in Fig. 2, and in the "reverse" position to interconnect the generator 2 and motor 8 as indicated in Fig. 3.

The induction motors 7 and 8 are wound for the same voltage between terminals but differ from each other in that the motor 7 is constructed for single speed operation and is insulated for a comparatively high voltage to ground while the motor 8 is arranged for operation at two different speeds and is insulated for a much lower voltage to ground. Assuming the generator voltage to be 5000, the motor 7 is wound for 2500 volts but insulated for 5000 volts while the motor 8 is wound for 2500 volts and insulated for about 3000 volts. In this arrangement the motor 7 may be wound with the most favorable coil pitch, owing to the fact that it is required to operate only at a single speed, but must have its stator coils insulated for the full generator voltage which is a disadvantage both with respect to the additional insulation required and the increase in size necessitated by reason of the larger space occupied by the insulation. The motor 8 is connected to the common neutral point and for this reason need have its stator coils insulated only for about one-half the generator voltage but is required to operate at different speeds and must therefore be given a coil pitch which is a compromise between those most suitable for each speed. It has been found that by thus constructing one motor to operate under the disadvantages incident to high voltage insulation and arranging the other motor to operate under the disadvantages which follow from operation on different sets of pole numbers a very material saving in the cost and weight of the motor equipment may be realized.

Assuming the controller 9 to be in the position diagrammatically shown in Fig. 1, the ship may be brought from rest to low speed ahead by moving the controller to the "low speed ahead" position in which the generator stator winding is connected in delta and the stator winding of the motor 8 is connected for the higher number of poles. To bring the ship up to full speed ahead the controller is moved to the "full speed ahead" position in which the generator is connected in Y and is adapted to supply current to the motors 7 and 8 which are connected in series, the motor 8 being connected to the neutral point and arranged for operation on the lower number of poles. In order to reverse the direction in which the ship is driven the controller must be moved to the "reverse" position in which the generator is connected in Y to the motor 8 for operation on the higher pole number under which conditions the highest reversing torque is available. When the ship is being reversed the reversing motor 8 requires so much current that the voltage of the generator even when connected in Y is pulled down to a value suitable for use with the low voltage motor. As the motor reverses and comes up to speed in the astern direction the generator voltage will rise and may be maintained within suitable limits by manipulating the generator field rheostat 6 or in any other suitable manner.

In the case of induction motor equipments of large capacity the subdivision of the motor equipment into two units per shaft instead of one is advantageous in that it enables the rotor units to be kept within practicable dimensions and facilitates the provision of adequate ventilation. It is very difficult to secure a sufficient supply of air to a single unit when the ratio of length to diameter becomes excessive. It should also be noted that the segregation of the functions between the two units in accordance with my invention generally permits the use of identical stator punchings and, when desirable, identical rotor punching in both units. It is possible to operate both motors at the same maximum current densities in stator copper and also at approximately the same effective amperes per slot since the double speed motor which contains the most copper carries currents considerably out of phase due to the compromise in coil pitch while the single speed motor has less current per slot due to the fact that the slot currents are more nearly in phase. It is therefore possible to reach a maximum permissible value of current per slot in each case without excessive slot dimensions.

What I claim as new and desire to secure by Letters Patent of the United States, is:—

1. A power system comprising an alternating current generator, a motor insulated for the full voltage of said generator and constructed for operation on a single pole number, a motor insulated for approximately one-half the voltage of said generator and arranged for operation on a plurality of pole numbers, and means for interconnecting said motors in series with each other to the terminals of said generator.

2. A system of ship propulsion comprising an alternating current generator, propeller driving means comprising a single pole number induction motor insulated for the full voltage of said generator and a plural pole number induction motor insulated for less than the full voltage of said generator, and switching means for connecting the armature winding of said generator in Y and for connecting said single pole number motor in series between said Y-connected winding and the high speed terminals of said plural pole number motor.

3. A system of ship propulsion comprising an alternating current generator, propeller driving means comprising a single pole number induction motor insulated for the full voltage of said generator and a plural pole number induction motor insulated for less than the full voltage of said generator, and switching means for connecting the armature winding of said generator in Y and said single pole number motor in series between said Y-connected winding and the high speed terminals of said plural pole number motor, or connecting said generator armature winding in delta and connecting said delta-connected winding to the low speed terminals of said plural pole number motor.

4. A system of ship propulsion comprising an alternating current generator, propeller driving means comprising a single pole number induction motor insulated for the full voltage of said generator and a plural pole number induction motor insulated for less than the full voltage of said generator, and switching means for connecting the armature winding of said generator in Y and said single pole number motor in series between said Y-connected winding and the high speed terminals of said plural pole number motor, or connecting said Y-connected winding to the low speed terminals of said plural pole number motor.

5. A system of ship propulsion comprising an alternating current generator, propeller driving means comprising a single pole number induction motor insulated for the full voltage of said generator and a plural pole number induction motor insulated for less than the full voltage of said generator, and switching means for connecting the armature winding of said generator in Y and said single pole number motor in series between said Y-connected winding and the high speed terminals of said plural pole number motor, connecting said Y-connected winding to the low speed terminals of said plural pole number motor, or connecting said generator armature winding in delta to the low speed terminals of said plural pole number motor.

In witness whereof, I have hereunto set my hand this 10th day of May, 1923.

CAMPBELL MACMILLAN.